United States Patent [19]

Moustakas et al.

[11] 4,425,725
[45] Jan. 17, 1984

[54] COMBINATION SWITCH PLATE AND PHOTOGRAPH HOLDER

[75] Inventors: Matthew A. Moustakas, Warrington; Edwin Olejkowski, Glenside, both of Pa.

[73] Assignee: Freelance, Inc., Willow Grove, Pa.

[21] Appl. No.: 380,527

[22] Filed: May 21, 1982

[51] Int. Cl.³ ................... A47G 1/06; H05K 5/03
[52] U.S. Cl. ......................... 40/152; 174/66; 40/10 D
[58] Field of Search ............ 40/152, 156, 10 R, 63, 40/10 D, 11 R; 220/241, 242; 174/54, 55, 56, 66, 67; D10/64; 24/255 R; 211/213, 69.5

[56] References Cited

U.S. PATENT DOCUMENTS

| | | | |
|---|---|---|---|
| 2,515,820 | 7/1950 | Clark | 174/66 |
| 3,953,933 | 5/1976 | Goldstein | 40/152 |
| 4,094,483 | 6/1978 | Busch | 24/255 R |
| 4,335,863 | 6/1982 | Rapps | 174/66 |
| 4,339,045 | 7/1982 | Bodin | 174/66 |

Primary Examiner—Gene Mancene
Assistant Examiner—James R. Hakomaki
Attorney, Agent, or Firm—Weiser & Stapler

[57] ABSTRACT

A combination switch plate and photograph holder is disclosed which includes a switch of suitable configuration to overfit a usual wall switch. A spring clip is seated within a recess in the switch plate and extends outwardly sufficiently to receive and engage a photograph holder. The photograph holder includes a square mounting box within which is positioned a mounting plate. The mounting plate cooperatively is engaged by the spring clip to secure the photograph holder to the switch plate in either vertical or horizontal orientation. In the preferred embodiment, the photograph holder includes in combination a planar base which is defined by a peripheral flange. The cover overfits a photograph and is engaged over the base by frictional contact between the respective peripheral flanges.

16 Claims, 4 Drawing Figures

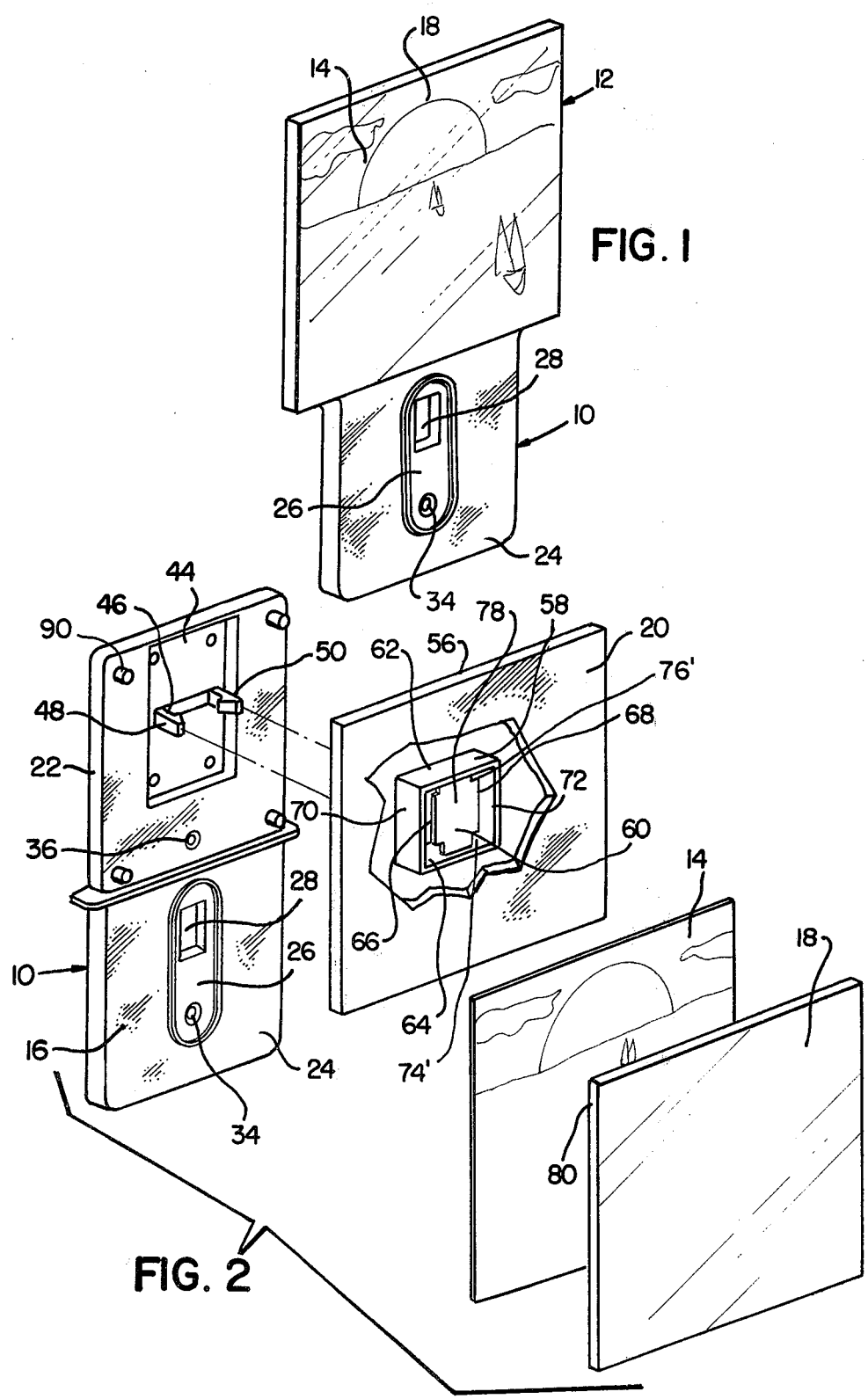

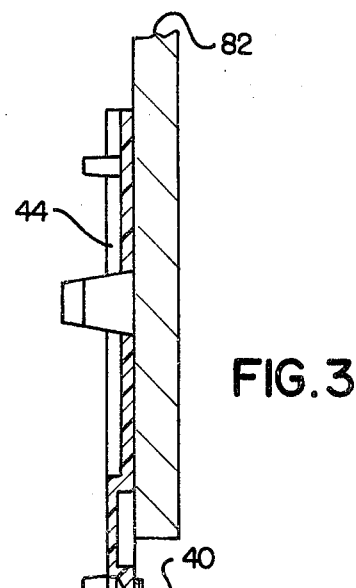
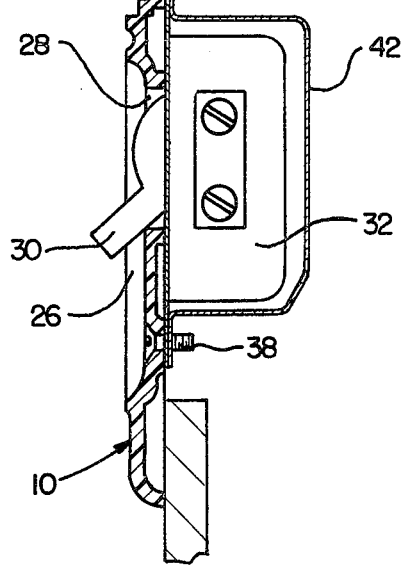
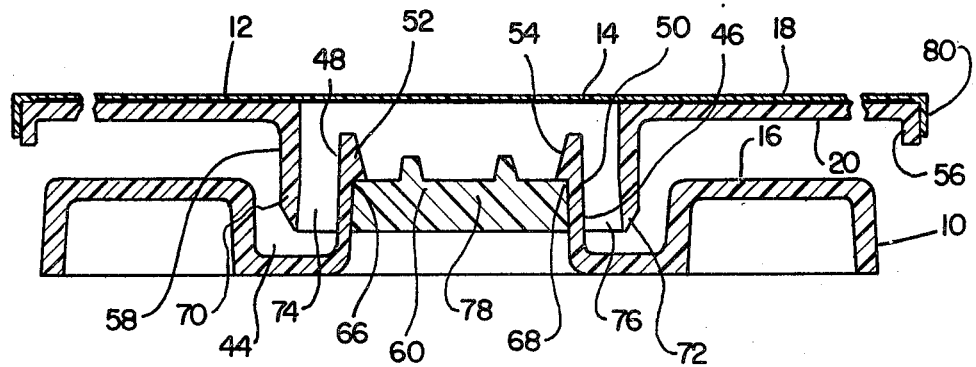

COMBINATION SWITCH PLATE AND PHOTOGRAPH HOLDER

BACKGROUND OF THE INVENTION

The present invention relates generally to the field of decorative switch plates, and more particularly, is directed to combination switch plate and holder for replaceable photographs.

It is the usual practice to provide switch plates over wall switches in place in residential, commercial and industrial installations for lighting circuits, fans, small motors and other low wattage installations. The prior art switch plates serve the dual purposes of protecting the users from possible contact with exposed electrical contacts and also to provide a decorative finish in and about the wall switch installation.

It is also well known to provide decorative switch plates when desired, which decorative plates can be fabricated of polished metal, mirror, painted ceramic and the like to enhance the aesthetic appearance of the switch plate itself and thereby the wall area over adjacent to the wall switch. So far as is known to the applicants, however, no one has successfully employed in combination a switch plate and a holder for a photograph in a manner to permit the installation of a photograph in overfitting relationship to the switch plate and also to provide a convenient means to change the photograph whenever so desired.

SUMMARY OF THE INVENTION

The present invention relates generally to the field of switch plates for wall switches, and more particularly, is directed to a switch plate including means to mount a photograph or other display holder in association with the switch plate.

The combination switch plate and photograph holder of the present invention includes a switch cover portion of size and configuration to conventionally overfit a usual toggle type wall switch. Suitable openings are provided in properly spaced relationship to allow the combination wall switch and photograph holder to be affixed to an existing wall switch at the existing threaded openings which are normally provided for affixation of the usual wall switch plate.

A photograph holding upper portion integrally extends from the switch cover portion and includes a pair of integral, outwardly extending spring prongs or clips which are configured and sized to engage the mounting box of a separable photograph holder base. Accordingly, once the combination switch plate is secured over the wall switch in usually manner, a cooperating photograph holder having means for easy photograph replacement can be readily engaged. In this manner, any desired decorative matter, such as a photograph, print, graphic design, etc. can be applied easily at and about the wall switch by simply placing the desired decorative material within the photograph holder.

As used herein, the term photograph holder or photo holder is defined to mean any frame-like structure intended for and adapted to display a decorative, planar object such as a photograph, a print, a drawing or other graphic display.

It is therefore an object of the present invention to provide an improved switch plate and photograph holder of the general type set forth.

It is another object of the present invention to provide a novel combination switch plate and photograph holder which includes in combination a generally planar body including means for affixing to a wall switch outlet box in combination with clip means for mounting a cooperating photograph holder.

It is another object of the present invention to provide a novel combination switch plate and photograph holder which comprises a planar body suitable for mounting over a wall switch, an opening for receiving therethrough the handle of the wall switch, a recess for receiving a photograph holder and a clip means within the recess to easily engage the photograph holder to thereby associate the photograph with the planar body.

It is another object of the present invention to provide a novel combination switch plate and photograph holder which comprises in combination a planar switch cover portion, a photograph holding portion, a clip means within the photograph holding portion for attaching a photograph holder, and mounting plate means engageable by the clip means to readily affix the photograph holder over a portion of the switch plate.

It is another object of the present invention to provide a novel combination switch plate and photograph holder that is simple in design, easy in installation and trouble free when in use.

It is another object of the present invention to provide a novel combination switch plate and photograph holder which includes in combination a switch plate body for affixing to a wall switch outlet box, a cooperating photograph holder, means to affix the photograph holder to the body in a first orientation and means to affix the photograph holder to the body in a second orientation, the second orientation being offset from the first orientation by ninety degrees.

Other objects and a fuller understanding of the invention will be had by referring to the following description and claims of a preferred embodiment, taken in conjunction with the accompanying drawings, wherein like reference characters refer to similar parts throughout the several views and in which:

BRIEF DESCRIPTION OF THE DRAWINGS

FIG. 1 is a perspective view showing the combination switch plate and photograph holder of the present invention.

FIG. 2 is an exploded, perspective view of the combination of FIG. 1.

FIG. 3 is an enlarged, cross-sectional view showing the switch plate installed over a wall switch.

FIG. 4 is an enlarged, cross-sectional view taken along line 4—4 on FIG. 1, looking in the direction of the arrows.

DESCRIPTION OF THE PREFERRED EMBODIMENT OF THE INVENTION

Although specific terms are used in the following description for the sake of clarity, these terms are intended to refer only to the particular structure of the invention selected for illustration in the drawings and are not intended to define or limit the scope of the invention.

Referring now to the drawings, there is illustrated in FIGS. 1 and 2 a combination switch plate 10 and photograph holder 12 which can be combined in the manner hereinafter more fully described to display a photograph 14 or other planar decorative material forwardly of the top surface 16 of the switch plate. Preferably, a clear plastic cover 18 overfits the photograph 14 in known manner and is releasably peripherally secured to the photograph holder base 20 to facilitate photograph replacement whenever so desired.

As best seen in FIGS. 2 and 3, the switch plate 10 is medially divided into a generally planar photograph holding upper portion 22 and a generally planar, lower, switch cover portion 24. The switch cover portion 24 includes a longitudinally aligned recess 26 within which is provided a switch toggle opening 28 of usual configuration to receive therethrough the toggle handle 30 of a conventional wall switch 32. A pair of spaced openings 34, 36 are provided in the switch plate 10 for conventionally affixing the switch plate to the wall switch 32 and outlet box 42 by employing a pair of threaded fasteners 38, 40 therethrough in well known manner.

The photograph holding portion 22 of the switch plate is provided with a longitudinally extending upper recess 44 within which is molded or otherwise formed an upwardly projecting clip means 46 which comprises left and right spring clips 48, 50. As best seen in FIG. 4, each of the spring clips 48, 50 terminates upwardly in an arrow-like projection or barb 52, 54 for securing the photograph holder 12 to the switch plate 10. Preferably the spring clips 48, 50 are integrally formed with the switch plate construction and are attached at their lower or inner ends to provide a spring-like quality for photograph holder connection purposes. The spring clips 48, 50 are formed in generally parallel spaced relation with the barbs 52, 54 facing inwardly.

Referring now to FIGS. 2 and 4, the photograph holder base 20 includes a peripheral flange 56 and a centrally located mounting box 58 of generally square cross-sectional configuration. The mounting box is preferably integrally molded with the photograph holder base 20 and is formed of suitable dimensions and configuration to easily fit within the upper recess 44 which is formed in the switch plate upper portion 22. The mounting box 58 carries a mounting plate means 60 secured between a pair of opposed mounting box walls 62, 64 for switch plate mounting purposes. The mounting plate means 60 positions intermediate the forward and rearward limits of the mounting box 58 and terminates laterally in sharp edges 66, 68 for secure engagement upon the barbs 52, 54 of the clip means 46. See FIG. 4. The mounting plate means edges 66, 68 and the respective other mounting box walls 70, 72 define a pair of spaced, clip received openings 74, 76 therebetween to facilitate the easy entrance of the spring clips 48, 50 for flexing therein sufficiently to allow the barbs 52, 54 to engage against the under surface 76 of the mounting plate means 60.

Similarly, when it is desired to orient the photograph holder 12 at ninety degrees to the position illustrated in the drawings, the barbs 52, 54 of the clip means 46 can be engaged in the optional clip receiving openings 74', 76' (FIG. 1) which are defined between the mounting box walls 62, 64 and other edge portions of the mounting plate means. Accordingly, the photograph holder can be assembled over the switch plate in either horizontal or vertical orientation, with any of the four sides facing toward the toggle switch handle 30.

A clear plastic cover 18 including a peripheral flange 80 overfits the photograph holder base 20 to conventionally secure a photograph or other decorative planar object therebetween. In known manner, the dimensions of the base flange 56 and the clear cover flange 80 are controlled and configured so as to provide a frictional, peripheral engagement of the cover 18 over the base 20 in manner to facilitate easy photograph replacement, whenever so desired.

In order to use the combination switch plate and photograph holder of the present invention, a desired photograph 14 or other decorative, planar item is placed between the photograph holder base 20 and the photograph holder plastic cover 18 and is secured therebetween by the frictional engagement of the cover 18 and the base 20. If a switch plate (not shown) is in place over the wall switch 32 to be decoratively treated, the existing switch plate should be removed conventionally by removing the existing threaded fasteners 38, 40. The same fasteners may be reused if desired, or new, similar fasteners may be applied. The switch plate 10 is affixed over the wall switch 32 and is secured thereto by threadedly engaging the fasteners 38, 40 with the existing threaded openings in the outlet box 42. As illustrated in FIG. 3, when the switch plate 10 is secured in position, the switch toggle handle 30 will project through the opening 28 in known manner to permit manual operation of the wall switch whenever so desired.

Once the switch plate 10 has been secured in position over the wall switch 32 and over the surrounding portion of the building wall 82, the photograph holder 12 can then be secured to the switch plate 10 in the manner hereinafter described in detail.

In order to secure the photograph holder to the switch plate 10, the photograph holder 12 is applied over the photograph holding upper portion 22 with the mounting plate means 60 in registry over the clip means 46 in the manner illustrated in FIG. 2. The photograph holder base 20 should be positioned so that the spring clips 48, 50 align with the spaces 74, 76 (or spaces 74', 76') which are defined between the mounting plate means 60 and the mounting box walls 70, 72, (or 62, 64) respectively. See FIG. 4.

The photograph holder 12 should then be pushed toward the switch plate upper portion 22 with the mounting box 58 positioned within the upper recess 44 until the spring clip arrow-like projections or barbs 52, 54 engage against the bottom or rear surface 78 of the mounting plate means 60. The arrow-like projections 52, 54 serve to spread the spring clips 48, 50 sufficiently as the mounting plate means 60 is pushed between the spring clips to allow the barbs 52, 54 to project rearwardly of the mounting plate means 60. Once the barbs 52, 54 have cleared the mounting plate means 60, the natural spring of the spring clip material causes the spring clips 48, 50 to again assume their parallel, unstressed positions to engage the barbs 52, 54 behind the mounting plate means 60 and thus secure the photograph holder 12 in position over the switch plate 10. The plurality of raised stabilizing pins 90 engage the rear of the photograph holder in serveral spaced locations to provide a sturdy, wobble-free installation after the spring clips are engaged upon the mounting plate means.

Although the present invention has been described with reference to the particular embodiment herein set forth, it is understood that the present disclosure has been made only by way of example and that numerous changes in the details of construction may be resorted to without departing from the spirit and scope of the invention. Thus, the scope of the invention should not be limited by the foregoing specification, but rather, only by the scope of the claims appended hereto.

What is claimed is:

1. A combination switch plate and display holder for mounting over the toggel handle of a wall switch comprising,
   a switch plate having a hole for receiving the toggle handle therethrough;
   a photograph holder in overlying relation to the switch plate;
   a clip means extending from the switch plate to secure the photograph holder to the switch plate; and
   a mounting plate means carried by the photograph holder to engage the clip means;
   whereby the photograph holder may be secured to the switch plate after the switch plate is mounted over the wall switch.

2. The combination of claim 1 wherein the clip means comprises a pair of spaced spring clips.

3. The combination of claim 2 wherein the spring clips terminate in barbed ends.

4. The combination of claim 3 wherein the barbed ends are adapted to engage the mounting clip means to secure the photograph holder to the switch plate.

5. The combination of claim 2 wherein the spring clips are integrally formed with the switch plate and extend from the switch plate in generally parallel relationship.

6. The combination of claim 1 wherein the switch plate is provided with a recess having a bottom, and wherein the clip means projects upwardly from the bottom of the recess.

7. The combination of claim 6 wherein the photograph holder comprises a planar base and a mounting box extending from the base, the mounting box being of size and configuration to insert within the said recess.

8. The combination of claim 7 wherein the mounting box comprises sidewalls which extend between a top and a bottom and wherein the mounting plate means is secured within the mounting box intermediate the top and bottom.

9. The combination of claim 8 wherein the mounting plate means and the sidewalls define at least one space therebetween.

10. The combination of claim 9 wherein a portion of the clip means is received within the space and wherein the clip means portion engages the mounting plate means when positioned in the space to secure the photograph holder to the switch plate.

11. The combination of claim 10 wherein the mounting plate means and the sidewalls define a second space therebetween, the second space being offset from the first space by ninety degrees.

12. The combination of claim 11 wherein a portion of the clip means is adapted to be received within the second space and wherein the clip means portion engages the mounting plate means when in the second space whereby the photograph holder can be mounted in a ninety degree offset orientation.

13. The combination of claim 1 wherein the photograph holder comprises a planar base and a peripheral flange, the flange defining the planar extent of the photograph holder.

14. The combination of claim 13 wherein the photograph holder further comprises a clear cover, the cover being provided with a peripheral flange of size to overfit and frictionally engage the flange of the planar base.

15. The combination of claim 13 wherein a mounting box extends from the planar base, the mounting box having sidewalls, a top and a bottom, the mounting plate means being secured between two spaced sidewalls intermediate the top and the bottom and defining spaces between the other of said side walls, the clip means extending into the spaces and engaging the mounting plate means.

16. A combination switch plate and display holder for mounting over the toggle handle of a wall switch comprising,
   a switch plate having a hole for receiving the toggle handle therethrough and a recess to receive a clip means;
   a photograph holder in overlying relation to the switch plate; said photograph holder including in combination a planar base which is defined by a peripheral flange;
   a clip means mounted in said recess and extending from the switch plate to secure the photograph holder to the switch plate; and
   a mounting plate means carried by the photograph holder and engaging the clip means;
   whereby the photograph holder is secured to the switch plate in a ninety degree offset orientation after the switch plate is mounted over the wall switch.

* * * * *